United States Patent
Poola et al.

(10) Patent No.: US 7,438,039 B2
(45) Date of Patent: Oct. 21, 2008

(54) LARGE-BORE, MEDIUM-SPEED DIESEL ENGINE HAVING PISTON CROWN BOWL WITH ACUTE RE-ENTRANT ANGLE

(75) Inventors: Ramesh B. Poola, Naperville, IL (US);
Nicholas Gryfakis, Chicago, IL (US);
German A. Acosta, Skokie, IL (US);
John L. Beasley, Chicago, IL (US);
James L. Blase, Lemont, IL (US);
Michael Goetzke, Orland Park, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 47 days.

(21) Appl. No.: 10/774,296

(22) Filed: Feb. 6, 2004

(65) Prior Publication Data

US 2005/0172926 A1    Aug. 11, 2005

(51) Int. Cl.
F02B 3/00    (2006.01)
(52) U.S. Cl. .................................. 123/193.6
(58) Field of Classification Search .............. 123/193.6, 123/661–664, 657; 92/173; 29/888.04
See application file for complete search history.

(56) References Cited

U.S. PATENT DOCUMENTS

| | | | |
|---|---|---|---|
| 4,297,983 A | 11/1981 | Ward | |
| 4,474,147 A | 10/1984 | Hoopes | |
| 4,616,612 A | 10/1986 | Jane | |
| 4,883,032 A | 11/1989 | Hunter et al. | |
| 4,955,338 A | 9/1990 | Diwakar et al. | |
| 5,081,968 A * | 1/1992 | Bruni | 123/193.6 |
| 5,158,055 A | 10/1992 | Oh et al. | |
| 5,317,958 A * | 6/1994 | Martins Leites et al. | 92/186 |
| 5,553,585 A | 9/1996 | Paro | |
| 5,778,846 A * | 7/1998 | Mielke | 123/193.6 |
| 6,164,260 A | 12/2000 | Bock | |
| 6,182,630 B1 * | 2/2001 | Zhu et al. | 123/193.6 |
| 6,234,134 B1 * | 5/2001 | Bedapudi et al. | 123/193.3 |
| 6,314,937 B1 * | 11/2001 | Bedapudi et al. | 123/305 |
| 6,401,680 B1 * | 6/2002 | Zhu et al. | 123/193.6 |
| 6,513,476 B1 | 2/2003 | Liu et al. | |
| 6,637,402 B2 | 10/2003 | Liu | |
| 2001/0040346 A1 | 11/2001 | Takashima | |

(Continued)

OTHER PUBLICATIONS

"Effects of Combustion Chamber Geometry on In-Cylinder Air Motion and Performance in DI Diesel Engine" Paper 2000-01-0510, Society of Automotive Engineers, 2000 World Conference, Detroit, MI, Mar. 6-9, 2000.

"Investigation of Effects of Piston Bowl and Fuel Injector Offsets on Combustion and Emissions in D.I. Diesel Engines" Paper 2002-01-1748, Society of Automotive Engineers, Spring Meeting, Reno, NV, May 6-9, 2002.

(Continued)

Primary Examiner—Marguerite McMahon
(74) Attorney, Agent, or Firm—Eugene M. Cummings, P.C.

(57) ABSTRACT

A large-bore (at least 180 mm diameter) diesel engine cylinder configuration featuring a piston crown bowl having an acute re-entrant angle and, optionally, an anti-polish ring. The acute re-entrant angle crown bowl involves a maximum radius of the crown bowl exceeding a minimum crown bowl radius, wherein the maximum crown bowl radius is located farther from the squish face than is the minimum crown bowl radius. The acute re-entrant angle crown bowl applied to large-bore, medium-speed diesel engines yields an improvement in performance and emissions characteristics. The anti-polish ring may be integrally formed with the cylinder liner and used in any internal combustion engine.

7 Claims, 5 Drawing Sheets

U.S. PATENT DOCUMENTS

| | | |
|---|---|---|
| 2001/0048199 A1 | 12/2001 | Evans |
| 2002/0189583 A1 | 12/2002 | Inoue et al. |
| 2003/0015167 A1 | 1/2003 | Liu et al. |
| 2003/0136372 A1 | 7/2003 | Liu et al. |
| 2003/0140890 A1 | 7/2003 | Liu et al. |
| 2003/0183178 A1 | 10/2003 | Caprotti et al. |
| 2003/0184023 A1 | 10/2003 | Masuyama et al. |
| 2003/0200955 A1 | 10/2003 | zur Loye et al. |
| 2003/0221657 A1 | 12/2003 | Sananes |

OTHER PUBLICATIONS

"Measurement and Modeling of the Flow-Field in a DI Diesel Engine: Effects of Piston Bowl Shape and Engine Speed" Paper 982587, Society of Automotive Engineers, Fall Meeting, San Francisco, CA, Oct. 19-22, 1998.

"Influence of Geometry on Flow in the Combustion Chamber of a Direct-Injection Diesel Engine" General Motors Corporation, Detroit, MI, Abstract of GM Document GMR-4995, Jun. 14, 1985.

* cited by examiner

LARGE-BORE, MEDIUM-SPEED DIESEL ENGINE HAVING PISTON CROWN BOWL WITH ACUTE RE-ENTRANT ANGLE

TECHNICAL FIELD

The present invention relates to diesel engines, and more particularly to diesel engine pistons having a crown bowl. Still more particularly, the present invention relates to a large-bore, medium-speed diesel engine piston crown bowl having an acute re-entrant angle of the bowl sidewall. The present invention further relates to internal combustion engine cylinders having an anti-polish ring.

BACKGROUND OF THE INVENTION

In-cylinder emissions reduction techniques have been continuously explored to meet the future regulated exhaust emissions standards for large-bore, medium speed diesel engines typically found in locomotives, marine and industrial co-generation power units.

For convenience, diesel engines are classified into high-speed and medium-speed engines based on engine bore size. Large-bore, medium-speed diesel engines have bore sizes ranging from 180 to 600 mm and small-bore and medium-bore, high-speed diesel engines have bore sizes ranging from 80 to 180 mm. The success of in-cylinder emissions control depends largely on the design and optimization of the combustion chamber and the characteristics of airflow and fuel spray. The key elements of the combustion chamber are the cooperating configurations of the piston, cylinder head, and piston ring pack.

Large-bore (at least 180 mm in diameter), medium-speed (between 900 and 1,500 rpm) direct injection diesel engines are traditionally designed to achieve best fuel economy and reliability for their intended applications, as for example those enumerated hereinabove. In order to meet these performance goals, the combustion chamber geometry, the in-cylinder air motion, and the fuel injection require careful matching in these engines.

Direct injection diesel engines inject fuel directly into the combustion chamber, which usually includes a recess, referred to as a crown bowl, in the crown (top) of the piston. In general, the shape of the crown bowl must be matched to the spray penetration and the air swirl. In the case of large-bore, medium-speed diesel engines, the momentum and energy of the high-pressure (above 20,000 psi) injected fuel jets are sufficient to achieve adequate fuel distribution and rates of mixing with the air. The combustion chamber shape afforded by the crown bowl is usually shallow and a central multi-hole injector is used. The air motion (swirl) generated by the shallow crown bowl is a minimum and, hence, it is commonly referred as a "quiescent combustion chamber." A crown bowl providing low or no air swirl offers reduced heat transfer losses, and thereby higher thermal efficiencies can be achieved. Further, the reduced need for air swirl allows for improved efficiency by decreasing the work required to pump air in and out of the engine. Further yet, the shallow crown bowl shape is less prone to severe thermal stresses, in particular at the contour of the crown bowl edge (that part of the crown bowl shape that interconnects the bowl outer sidewall surface with the piston squish face), thereby helping to maintain high engine reliability.

Over the last few years, large-bore, medium-speed diesel engines have become subject to more stringent exhaust emissions regulations by the US Environmental Protection Agency (EPA), the International Maritime Organization (IMO), and the International Union of Railways Commission (UIC). In order to meet these new emissions regulations, while maintaining higher fuel economy and reliability, new combustion chamber optimizations need to be devised, particularly with respect to combustion chamber geometry, in-cylinder air motion, and fuel injection.

Piston configurations having combustion optimization features such as a deep crown bowl and an acute re-entrant angle of the bowl outer sidewall shape can be found in the prior art with respect to small-bore, high-speed (cylinder bores of less than 100 mm and speeds greater than 2,500 rpm) diesel engines, as well as medium-bore, high-speed (cylinder bores of from 80 to between 140 and 180 mm and speeds greater than 1,800 rpm) diesel engines.

As the diesel engine size decreases, in addition to fuel jet momentum, increasing amounts of air swirl are used to achieve faster fuel-air mixing rates. The air swirl is generated by suitably shaped air inlet ports, and is amplified during compression by forcing most of the air toward the cylinder axis into the deep crown bowl combustion chamber. In this regard, smaller diameter, deeper crown bowls will generate greater air swirl as air inlet port generated swirl is compressed into the small diameter crown bowl. Because of conservation of angular momentum, the reduction in cylinder diameter greatly accelerates the angular velocity of the air. Further, air swirl helps to minimize the fuel spray jet impingement on the crown bowl sidewall. Without appropriate air swirl (air motion), fuel spray impingement leads to sidewall wetting, which increases production of certain undesired (i.e., hydrocarbon) emissions and component wear (for example, metal erosion and increased friction due to dilution of lubricating oil). In general, the small-bore and medium-bore, high-speed diesel engines are subjected to lower mechanical and thermal loads when compared to large-bore, medium speed diesel engines. Consequently, the crown bowl designs for small-bore and medium-bore, high speed diesel engines are more flexible than large-bore, medium speed diesel engines with respect to re-entrant angle of the crown bowl sidewall and the contours of bowl edge (sharp or rounded re-entrant lip).

Figure 1:
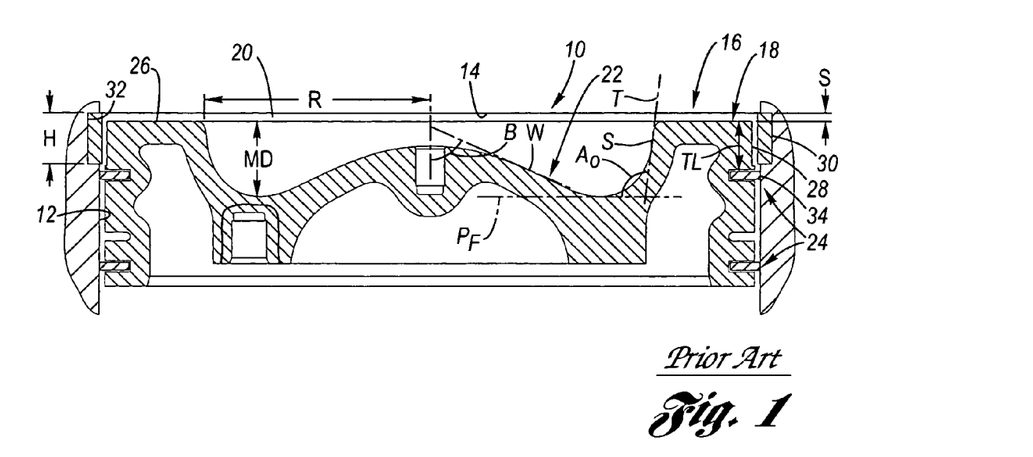
FIG. 1 is a sectional view of a prior art large-bore diesel engine cylinder depicting a piston having a prior art obtuse re-entrant angle crown bowl and a prior art anti-polish ring.

Referring now to FIG. 1, a typical large-bore, low speed diesel engine includes a plurality of cylinders, each cylinder 10 having a cylinder liner wall 12, a cylinder head 14 and a reciprocating piston 16 having a piston crown 18 at the top of the piston, which forms part of the combustion chamber 20. The piston crown 18 includes, typically, a crown bowl 22, a piston ring pack 24, a piston squish face 26, and top land 28, which in combination influence the nature of fuel combustion, heat transfer, and engine emissions characteristics. Pistons 16 can be configured with different shapes of the crown bowl 22, such as for example by variation of bowl depth MD (i.e., shallow or deep), bowl shape (i.e., hemispherical, cylindrical), angle B of the bowl inner wall W, bowl re-entrant angle $A_O$ (which is obtuse) of a tangent T of the bowl sidewall S with respect to a plane $P_F$ parallel to the piston squish face 26, bowl radius R, as well as squish height S between the piston squish face and the cylinder head 14 when the piston is at top dead center (as shown at FIG. 1), and top land height TL, to obtain specific geometry compression ratio, and desired air-fuel mixing conditions.

However, in the case of large-bore, medium speed diesel engines, the momentum and energy of the injected fuel is sufficient to achieve adequate fuel distribution and rates of mixing with the air. Accordingly, the customary crown bowl shape is shallow and has an obtuse re-entrant angle of the crown bowl sidewall. Particular crown bowl shapes are unique to various engine manufacturers with many individual features satisfying particular applications.

Accordingly, what remains needed in the art is advancement in the piston crown bowl shape of large-bore, medium-speed diesel engines to further optimize fuel spray, in-cylinder air motion, and fuel air mixing to lower undesired emission without paying a severe penalty in regard to fuel economy and/or reliability of the engine.

Another area of concern is operational development of cylinder polish. Cylinder polish is one of the most serious and difficult to overcome problems that is commonly encountered in diesel engines. Cylinder polish arises from the rubbing action of hard carbon on the top land of the piston under the natural motion of the piston, causing removal of the honing pattern, and leaving a polished region usually on the non-thrust side. The formation of carbon deposits on the piston top land, rim, and around the piston ring pack occurs due to accumulation of partially burned hydrocarbons and lubricating oil during the combustion process. These deposits grow over a period of time and become hard carbonaceous structures facilitating the rubbing action against the cylinder wall. Once cylinder polish begins, despite small local cylinder wear, the piston rings of the piston ring pack will have difficulty in controlling oil flow in this region due to nonconformity of contact surface, and the oil consumption begins to increase. This cylinder polish can happen over a period of time, depending on the severity of the rate of accumulation of the carbon deposits.

One of the solutions to mitigate cylinder polish is to place an anti-polish ring 30 (also know as flame ring, fire ring, or carbon cutting ring) into the cylinder liner wall 12 adjacent the head and adjacent the piston top land 28 when the piston is at the top dead center of its travel, as shown at FIG. 1. This anti-polish ring 30 is an insert into a slot 32 in the cylinder liner wall 12, is made of steel or cast iron, and projects slightly towards the piston land, wherein the piston top land 28 is cut back to compensate for this projection, thereby minimizing the dead volume between the piston and anti-polish ring. The anti-polish ring 30 prevents build-up of hard carbon beyond its inner diameter, and, as a result, no cylinder polish can take place, as the carbon is always clear of the cylinder wall as the piston moves away from its top dead center position.

The variables considered for configuring the anti-polish ring 30 include, height H, thickness and projection thereof into the cylinder. The maximum height possible for the anti-polish ring 30 is the distance between the cylinder head 14 and the first piston ring 34 of the piston ring pack 24 when the piston is at top dead center. Conceivably, the dimensions and arrangement of the anti-polish ring can be varied to meet the particular needs of given engine tolerances.

Accordingly, what further remains needed in the art is an anti-polish ring applied to large-bore, medium speed diesel engines, as well as advancements for interfacing an anti-polish ring with a cylinder liner wall.

SUMMARY OF THE INVENTION

The present invention is a large-bore (of at least 180 mm in diameter) diesel engine cylinder configuration featuring a piston crown bowl having an acute re-entrant angle of the bowl sidewall relative to the piston squish face plane, and, optionally, an anti-polish ring in the cylinder liner wall, wherein such large-bore diesel engines typically operate at medium speeds between about 900 to 1,500 rpm.

According to the present invention, an acute re-entrant angle crown bowl is provided for the piston crown of a large-bore diesel engine, yielding an improvement in performance and emissions characteristics. The key design variables of the acute re-entrant angle crown bowl according to the present invention include: re-entrant angle of the sidewall of the crown bowl, maximum and minimum crown bowl radii, crown bowl center depth, crown bowl surface angle, maximum crown bowl depth, squish height and piston squish face width.

For a given size large-bore diesel engine, breathing capacity, airflow, and fuel flow conditions, the acute re-entrant angle crown bowl facilitates the combustion process, resulting in lower $NO_x$ formation and enhanced oxidation of soot, hydrocarbons, and carbon monoxide emissions. By changing the fuel injection timing and injection characteristics (injection pressure, rate of injection, and spray angle), the acute re-entrant angle crown bowl offers the best balance trade-off of minimization of harmful emissions and performance optimization. For example, multiple injections through a high-pressure common rail injection can benefit from an acute re-entrant angle crown bowl with enhanced air movement and air utilization within the combustion chamber.

Recent advancements in high-temperature materials, manufacturing processes and fuel injection systems such as electronically controlled high-pressure common rail injection provides greater flexibility in designing piston bowl shapes for large-bore, medium speed diesel engines. The current invention discloses a piston bowl design with an acute re-entrant angle bowl shape taking advantages of the delineated advancements. When fuel injection event is properly matched with the acute re-entrant angle crown bowl shape, the spray combustion process can be optimized to achieve higher fuel efficiency and lower exhaust emissions simultaneously. For example, with multiple fuel injections per combustion event, an acute re-entrant angle crown bowl offers additional flexibility in controlling the mixing process, wherein the spray-induced flow field takes the shape of the crown bowl. Thus, it is more likely that the combusting products will stay down in the hot region of the crown bowl where they have a higher chance of being completely burned. Any remaining unburned soot resides in the crown bowl during the expansion stroke, thus increasing the likelihood of being burned in the following combustion event, as compared to conventional shallow crown bowl shapes. Additionally, the resulting thermal and mechanical loads are relatively less severe, which permits re-entrant contours at the bowl edge (or lip or rim).

The re-entrant angle of the crown bowl is related to the orientation of the crown bowl sidewall relative to the plane of the squish face of the piston. More precisely, the re-entrant angle is defined as follows. A lower curve radius defines a lower curve of the crown bowl which adjoins the maximum bowl depth and the crown bowl sidewall, and an upper curve radius defines an upper curve of the crown bowl which is adjacent the squish face and also adjoins the crown bowl sidewall. A sidewall tangent is formed by the intersection of the upper and lower curve radii, wherein the sidewall tangent defines the orientation of the crown bowl sidewall. The re-entrant angle is, then, defined as the angle of the sidewall tangent relative to a squish face plane parallel to the squish face, wherein the angle is measured clockwise from the squish face plane. An acute re-entrant angle provides, therefore, a physical configuration in which a maximum bowl radius of the crown bowl is located farther from the squish face than is a minimum radius of the crown bowl, wherein the maximum bowl radius is larger than the minimum bowl radius.

Additionally, it is preferred to include an anti-polish ring in the cylinder liner wall to additionally provide the benefit of preventing development of cylinder polish. In particular, the anti-polish ring may be provided as an integral part of the cylinder liner, the cylinder liner and anti-polish ring being a single piece.

Accordingly, it is an object of the present invention to provide a large-bore diesel engine having pistons provided with an acute re-entrant angle crown bowl.

It is an additional object of the present invention to provide a large-bore diesel engine having pistons provided with an acute re-entrant angle crown bowl, and further to provide the cylinders thereof with an anti-polish ring.

It is an additional object of the present invention to provide a cylinder liner and anti-polish ring as a single-piece, integral structure.

These and additional objects, features and advantages of the present invention will become clearer from the following specification of a preferred embodiment.

DESCRIPTION OF THE PREFERRED EMBODIMENT

Referring now to the drawing, FIGS. 2A through 8B depict various aspects of the present invention. In the various views of FIGS. 2A, 3A, 4A, 5, 6 and 7, a large-bore (of at least 180 mm diameter) diesel engine cylinder 100 is shown featuring a piston having an acute re-entrant angle crown bowl, wherein for comparative and referential purposes, the prior art obtuse re-entrant angle crown bowl 22 of FIG. 1 is shown in phantom.

Figure 2A:
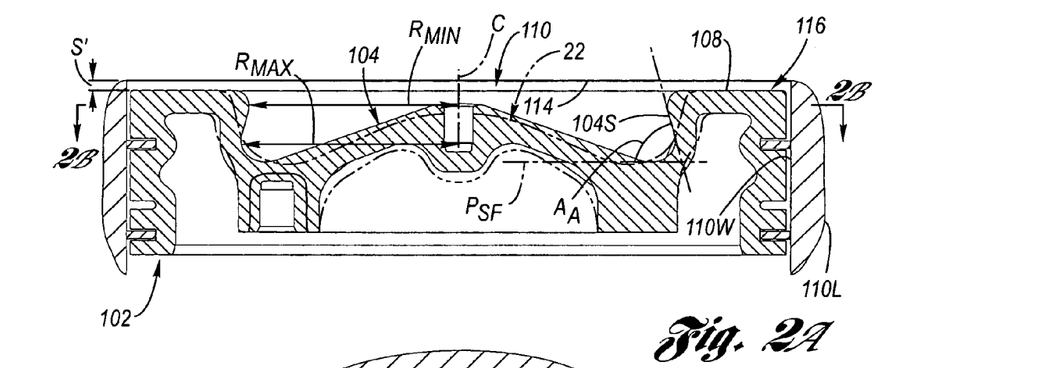
FIG. 2A is a sectional view of a large-bore diesel engine cylinder depicting a piston thereof having an acute re-entrant angle crown bowl according to the present invention.
Figure 2B:
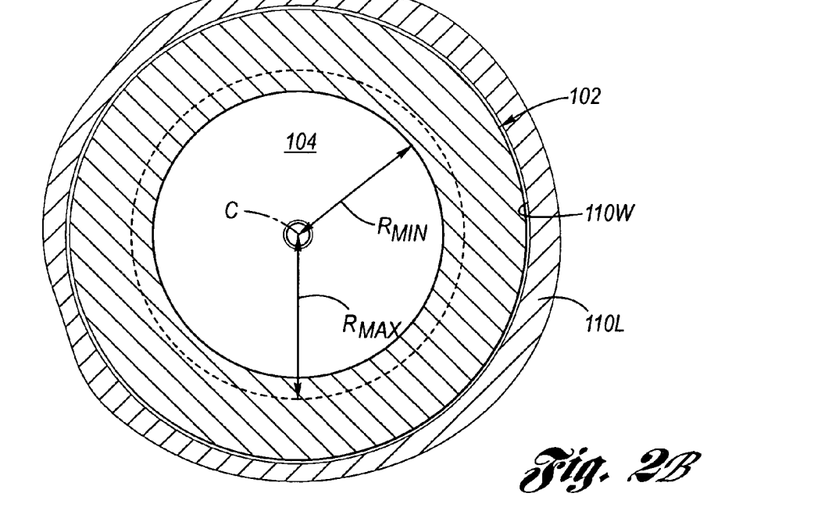
FIG. 2B is a partly sectional view seen along line 2B-2B of FIG. 2A.

Referring firstly to FIGS. 2A and 2B, depicted is a large-bore (at least about 180 mm in diameter) diesel engine cylinder 110. The cylinder 110 has a cylinder liner 110L having a cylinder liner wall 110W, and includes thereat a cylinder head 114 and a piston 102 having a piston crown 116, wherein the piston crown has an acute re-entrant angle crown bowl 104. The acute re-entrant angle $A_A$ is related to the orientation of the bowl sidewall 104S relative to a squish face plane $P_{SF}$ which is oriented parallel to the squish face 108 of the piston.

Figure 2C:
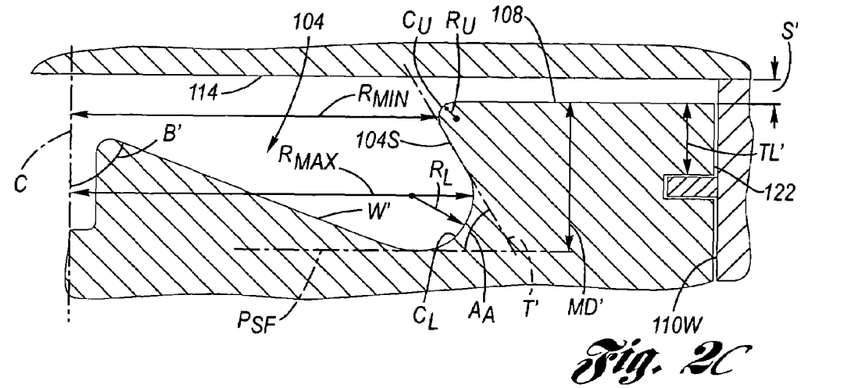
FIG. 2C is a sectional view if a piston having an acute re-entrant angle crown bowl, whereby the re-entrant angle is defined.

FIG. 2C depicts how the acute re-entrant angle $A_A$ is defined. A lower curve radius $R_L$ defines a lower curve $C_L$ of the crown bowl which adjoins the maximum bowl depth MD' and the crown bowl sidewall, and an upper curve radius $R_U$ defines an upper curve $C_U$ of the crown bowl which is adjacent the squish face 108 and also adjoins the crown bowl sidewall. A sidewall tangent T' is formed by the intersection of the upper and lower curve radii, wherein the sidewall tangent defines the orientation of the crown bowl sidewall. The re-entrant angle $A_A$ is, then, defined the angle of the sidewall tangent T' relative to the squish face plane $P_{SF}$ (which is parallel to the squish face), wherein the angle is measured clockwise from the squish face plane. The acute re-entrant angle provides a physical configuration of the crown bowl 104 in which a maximum bowl radius $R_{MAX}$ of the crown bowl is located farther from the squish face 108 than is a minimum radius $R_{MIN}$ of the crown bowl, wherein both radii are measured from the piston (or piston crown) centerline C, and wherein the maximum bowl radius $R_{MAX}$ is longer than the minimum bowl radius $R_{MIN}$. Additionally, it will be seen that the bowl inner wall W' has an angle B' with respect to the piston centerline C, and there is a top land height TL' of the piston land 122.

Figure 3A:
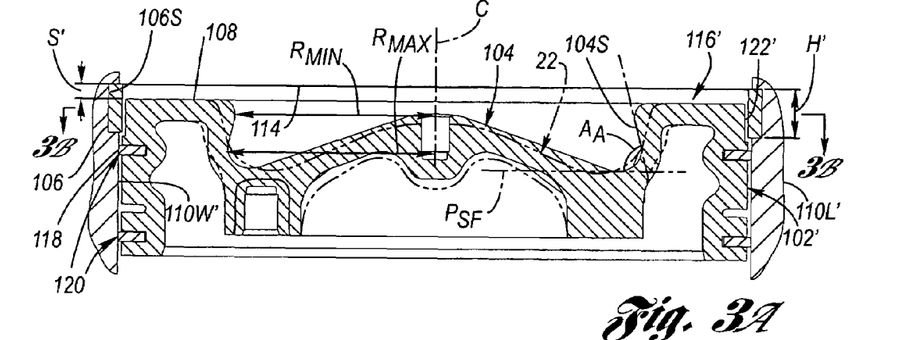
FIG. 3A is a sectional view of a large-bore diesel engine cylinder depicting a piston thereof having an acute re-entrant angle crown bowl according to the present invention, and wherein the cylinder liner features an anti-polish ring.
Figure 3B:
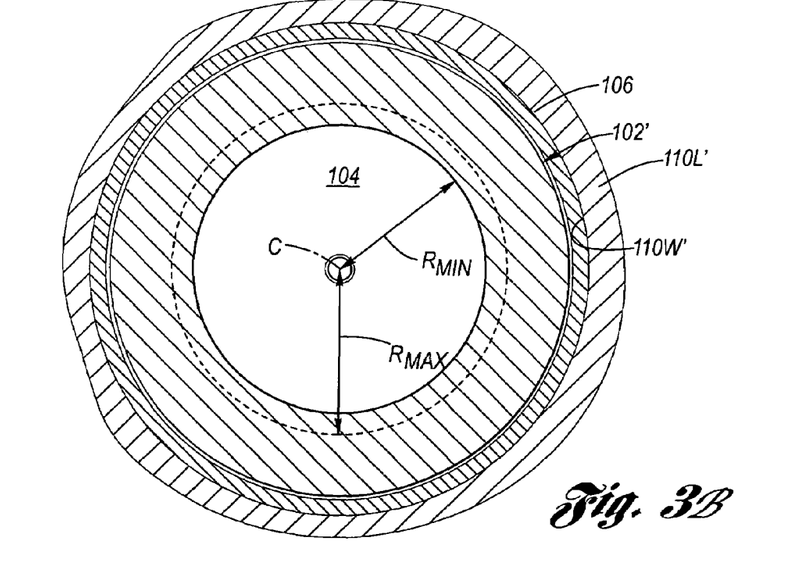
FIG. 3B is a partly sectional view seen along line 3B-3B of FIG. 3A.

Referring next to FIGS. 3A and 3B, it will be seen that the cylinder liner 110L' has a cylinder liner wall 110W' which is now provided with an anti-polish ring 106 received in a slot 106S thereof adjacent the cylinder head 114 and adjacent the piston crown 116' when the piston 102' is at top dead center, as shown at FIG. 3A. In this regard, FIG. 3A shows that the anti-polish ring has a height H' of, for example, about 40 mm, such that the lowermost location avoids contact by the first (upper) piston ring 118 of the piston ring pack 120. The anti-polish ring 106 is made of steel or cast iron and is projected slightly towards piston crown 116', wherein the piston land 122' is now recessed (cut back) thereat to compensate for this projection, thereby minimizing the dead volume between the piston and anti-polish ring. The anti-polish ring 106 prevents build-up of hard carbon beyond its inner diameter, and, as a result, no cylinder polish can take place, as the carbon is always clear of the cylinder liner as the piston moves away from its top dead center position. The design variables in the anti-polish ring 106 include height, thickness and projection into the cylinder.

Figure 4A:
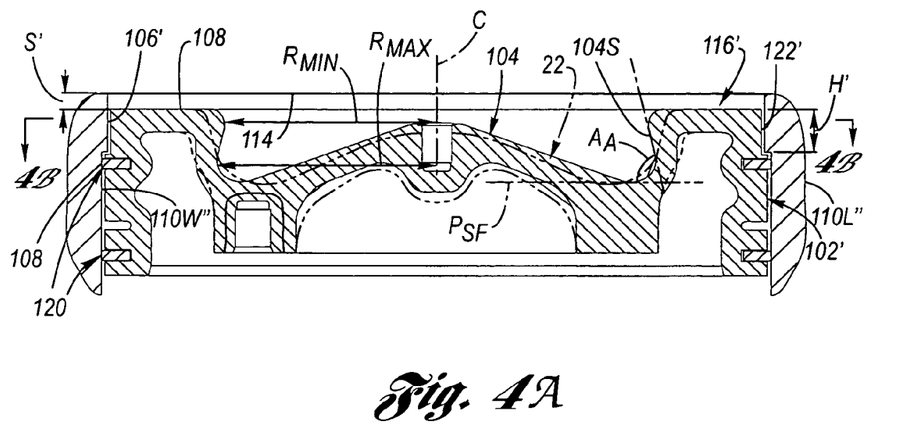
FIG. 4A is a sectional view of a large-bore diesel engine cylinder as in FIG. 3A, wherein now the anti-polish ring is integrally formed with the cylinder liner.
Figure 4B:
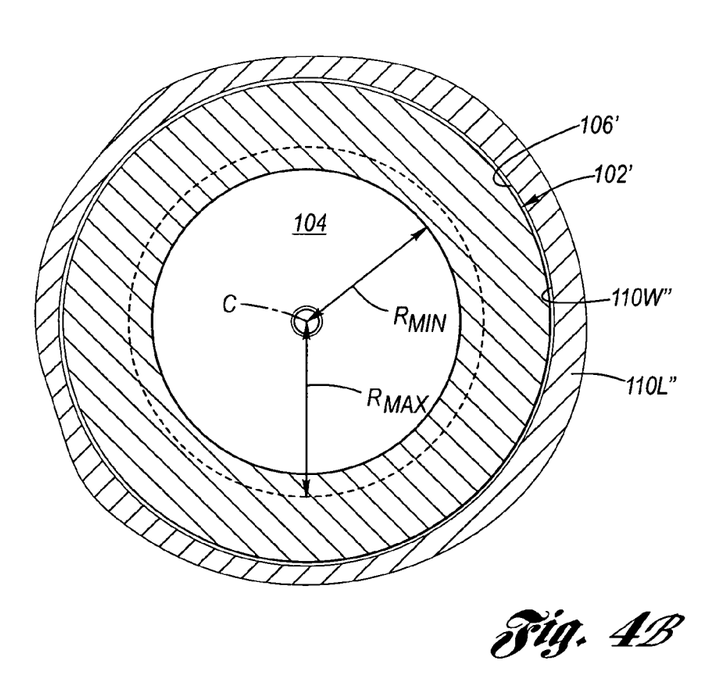
FIG. 4B is a partly sectional view seen along line 4B-4B of FIG. 4A.

It will be seen that FIGS. 4A and 4B are similar to FIGS. 3A and 3B, except now the anti-polish ring 106' is integrally formed as a single piece construction with the cylinder liner 110", projecting with respect to the cylinder liner wall 110W", wherein the anti-polish ring also has, by way of example, the height H'. It is to be noted that an integral, single piece construction of the anti-polish ring and the cylinder liner as shown at FIGS. 4A and 4B is applicable to any internal combustion engine, wherein a large-bore diesel engine is shown merely by way of exemplification.

Figure 5:
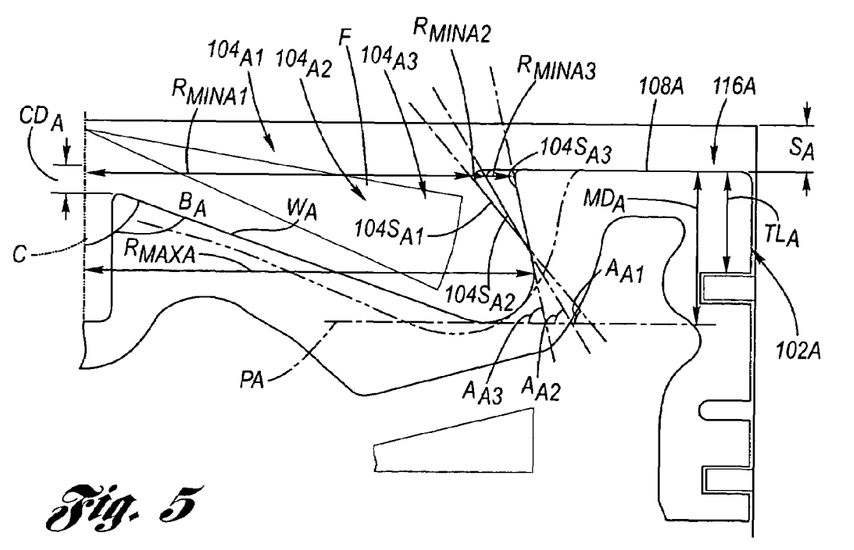
FIG. 5 is a sectional view (cross-hatching omitted for clarity) of a bisected large-bore diesel engine piston, showing a first series of preferred acute re-entrant angle crown bowls according to the present invention.
Figure 6:
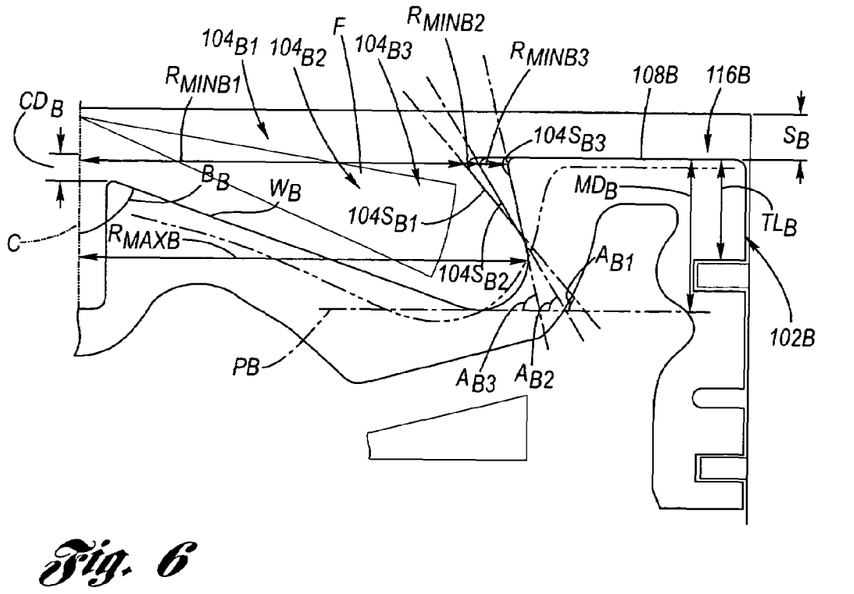
FIG. 6 is a sectional view (cross-hatching omitted for clarity) of a bisected large-bore diesel engine piston, showing a second series of preferred acute re-entrant angle crown bowls according to the present invention.
Figure 7:
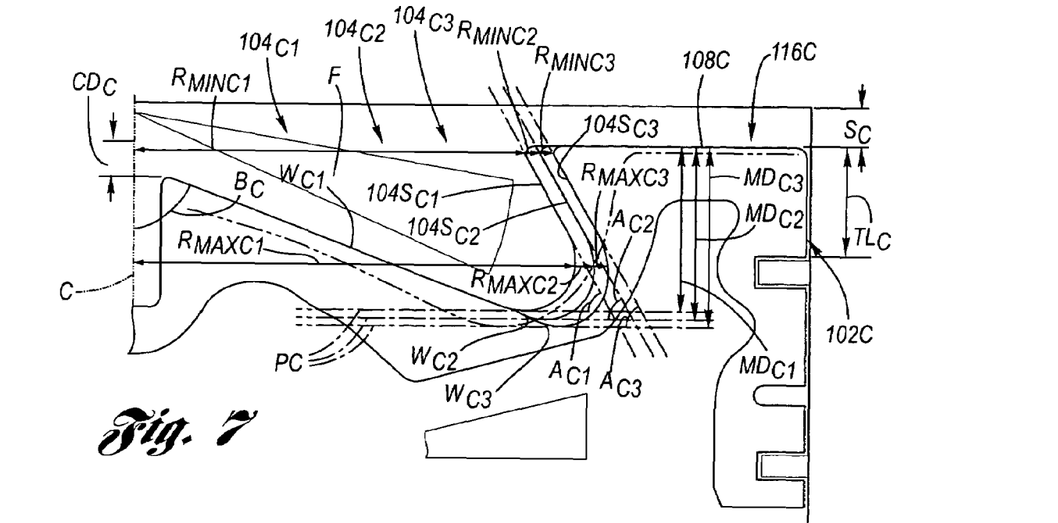
FIG. 7 is a sectional view (cross-hatching omitted for clarity) of a bisected large-bore diesel engine piston, showing a third series of preferred acute re-entrant angle crown bowls according to the present invention.

Turning attention now to FIGS. 5 through 7, examples of pistons having preferred acute re-entrant angle crown bowls are depicted, for large-bore, medium-speed diesel engines. For comparative purposes, the conventional (prior art) obtuse re-entrant angle crown bowl 22 of FIG. 1 is also depicted.

FIG. 5 shows a piston 102A in which is formed in the piston crown 116A thereof any one of a first series of preferred piston acute re-entrant angle crown bowls: crown bowl $104_{A1}$ having an acute re-entrant angle $A_{A1}$ of the bowl sidewall $104S_{A1}$ relative to the plane PA of the squish face 108A, and having a minimum bowl radius $R_{MINA1}$; crown bowl $104_{A2}$ having an acute re-entrant angle $A_{A2}$ of the bowl sidewall $104S_{A2}$ relative to the plane PA of the squish face 108A, and having a minimum bowl radius $R_{MINA2}$; and crown bowl $104_{A3}$ having an acute re-entrant angle $A_{A3}$ of the bowl sidewall $104S_{A3}$ relative to the plane PA of the squish face 108A and having a minimum bowl radius $R_{MINA3}$. In each of the acute angle reentry crown bowls of FIG. 5, the squish height $S_A$, maximum bowl radius $R_{MAXA}$, bowl center depth, $CD_A$, maximum bowl depth $MD_A$, length of the bowl inner wall $W_A$, angle $B_A$ of the bowl inner wall, and length of the piston top land $TL_A$ are all held constant.

FIG. 6 shows a piston 102B in which is formed in the piston crown 116B thereof any one of a second series of preferred piston acute re-entrant angle crown bowls: crown bowl $104_{B1}$ having an acute re-entrant angle $A_{B1}$ of the bowl sidewall $104S_{B1}$ relative to the plane PB of the squish face 108B, and having a minimum bowl radius $R_{MINB1}$; crown bowl $104_{B2}$ having an acute re-entrant angle $A_{B2}$ of the bowl sidewall $104S_{B1}$ relative to the plane PB of the squish face 108B, and having a minimum bowl radius $R_{MINB2}$; and crown bowl $104_{B3}$ having an acute re-entrant angle $A_{B3}$ of the bowl sidewall $104S_{B3}$ relative to the plane PB of the squish face 108B, and having a minimum bowl radius $R_{MINB3}$. In each of the acute angle reentry bowls of FIG. 6 the squish height $S_B$, maximum bowl radius $R_{MAXB}$, bowl center depth, $CD_B$, maximum bowl depth $MD_B$, length of the bowl inner wall $W_B$, angle $B_B$ of the bowl inner wall, and length of the piston top land $TL_B$ are all held constant.

FIG. 7 shows a piston 102C in which is formed in the piston crown 116C thereof any one of a third series of preferred piston acute re-entrant angle crown bowls: crown bowl $104_{C1}$ having an acute re-entrant angle $A_{C1}$ of the bowl sidewall $104S_{C1}$ relative to the plane PC of the squish face 108C, and having a maximum bowl radius $R_{MAXC1}$, a minimum bowl radius $R_{MINC1}$, a length of the bowl inner wall $W_{C1}$, and a maximum bowl depth $MD_{C1}$; crown bowl $104_{C2}$ having an acute re-entrant angle $A_{C2}$ of the bowl sidewall $104S_{C2}$ relative to the plane PC of the squish face 108C, and having a maximum bowl radius $R_{MAXC2}$, a minimum bowl radius $R_{MINC2}$, a length of the bowl inner wall $W_{C2}$, and a maximum bowl depth $MD_{C2}$; and crown bowl $104_{C3}$ having an acute re-entrant angle $A_{C3}$ of the bowl sidewall $104S_{C3}$ relative to the plane PC of the squish face 108C, and having a maximum bowl radius $R_{MAXC3}$, a minimum bowl radius $R_{MINC3}$, a length of the bowl inner wall $W_{C3}$, and a maximum bowl depth $MD_{C3}$. In each of the acute angle reentry crown bowls of FIG. 7, the squish height $S_C$, bowl center depth $CD_C$, angle $B_C$ of the bowl inner wall, and length of the piston top land $TL_C$ are all held constant.

Any of the above shown preferred acute re-entrant angle crown bowls of FIGS. 5, 6 and 7 may be reconfigured in accordance with a given large-bore diesel engine, as for example variations in: re-entrant angle, maximum bowl radius, minimum bowl radius, maximum bowl depth, piston squish face width, piston bowl center depth and squish height. Further, any of the embodiments delineated may be combined with an anti-polish ring, as shown at FIGS. 3A through 4B to reduce the cylinder polish, piston scuffing and lube oil consumption.

Figure 8A:
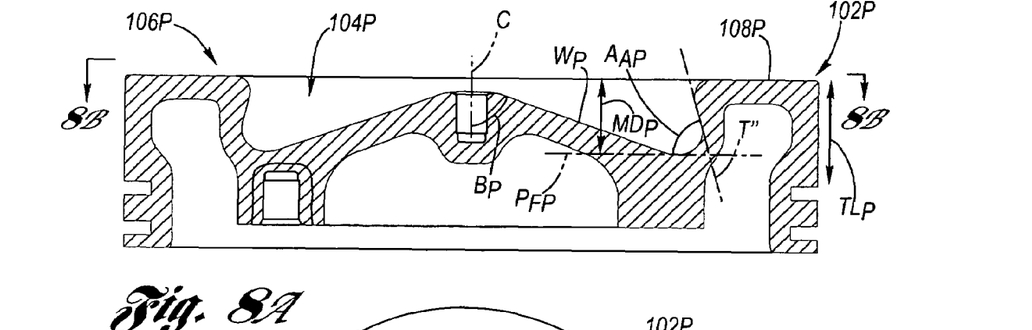
FIG. 8A is a sectional view of a bisected large-bore diesel engine piston, showing a preferred acute re-entrant angle crown bowl according to the present invention.
Figure 8B:
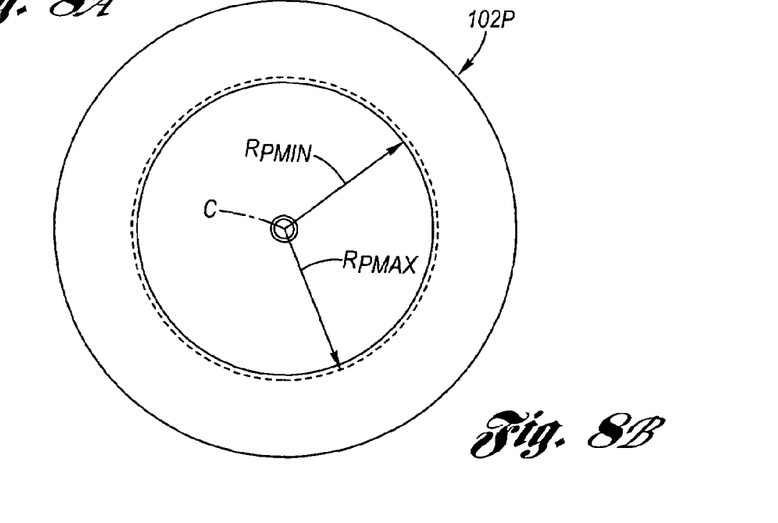
FIG. 8B is a top plan view seen along line 8B-8B of FIG. 8A.

Referring now to FIGS. 8A and 8B, depicted is a preferred large-bore diesel engine piston 102P having a diameter of 263 mm which was constructed and tested. The piston 102P has a piston crown 116P having an acute re-entrant angle crown bowl 104P. The acute re-entrant angle $A_{AP}$ is defined by the angle of the sidewall tangent T' of the bowl sidewall 104SP relative to a squish plane $P_{FP}$ which is oriented parallel to the squish face 108P of the piston, wherein $A_{AP}$ has a value of 77 degrees, the maximum bowl radius $R_{PMAX}$ has a value of about 89 mm, and the minimum bowl radius RPMIN has a value of about 87 mm, the bowl inner wall $W_P$ has a length of 91 mm, the bowl inner wall has an angle $B_P$ relative to the centerline C of 71 degrees, and a top land height $TL_P$ of 40 mm Values for the various dimensions of the embodiments depicted by FIGS. 5, 6, 7 and 8 are given in Table I, wherein Table I further includes a comparison to representative prior art dimensions.

TABLE I

| | ENGINE DIMENSIONS (approximate values) | | | | |
|---|---|---|---|---|---|
| Parameter | Prior Art | FIG. 5 | FIG. 6 | FIG. 7 | FIG. 8 |
| Re-entrant angle, A (deg) | greater than 90 | $A_{A1}$ = 50<br>$A_{A2}$ = 58<br>$A_{A3}$ = 77 | $A_{B1}$ = 50<br>$A_{B2}$ = 58<br>$A_{B3}$ = 77 | 58 | 77 |
| Maximum bowl radius, $R_{max}$ (mm) | 94 | 89 | 91 | $R_{MAXC1}$ = 87<br>$R_{MAXC2}$ = 91<br>$R_{MAXC3}$ = 94 | 89 |
| Minimum bowl radius, $R_{min}$ (mm) | 99 | $R_{MINA1}$ = 79<br>$R_{MINA2}$ = 81<br>$R_{MINA3}$ = 87 | $R_{MINB1}$ = 77<br>$R_{MINB2}$ = 82<br>$R_{MINB3}$ = 89 | $R_{MINC1}$ = 79<br>$R_{MINC2}$ = 82<br>$R_{MINC3}$ = 85 | 87 |
| Maximum bowl depth, MD (mm) | 32 | 30 | 30 | $MD_{C1}$ = 28<br>$MD_{C2}$ = 30<br>$MD_{C3}$ = 32 | 30 |
| Lower curve radius, $R_L$ (mm) | 21 | 10 | 10 | 10 | 10 |
| Upper curve radius, $R_U$ (mm) | 4 | 6 | 6 | 6 | 6 |
| Bowl center depth, CD (mm) | 10 | 5 | 5 | 5 | 5 |
| Top land height, TL (mm) | 19 | 19 | 19 | 19 | 40 |
| Bowl inner wall angle, B (deg) | 67 | 71 | 71 | 71 | 71 |

TABLE I-continued

ENGINE DIMENSIONS
(approximate values)

| Parameter | Prior Art | FIG. 5 | FIG. 6 | FIG. 7 | FIG. 8 |
|---|---|---|---|---|---|
| Length of bowl inner wall W from piston centerline C to maximum bowl depth MD (mm) | 75 | 81 | 81 | $W_{C1} = 77$<br>$W_{C2} = 81$<br>$W_{C3} = 84$ | 91 |
| Cylinder bore diameter (mm) | 265 | 265 | 265 | 265 | 265 |
| Piston crown diameter (mm) | 263 | 263 | 263 | 263 | 263 |

For a given engine size, breathing capacity, airflow, and fuel flow conditions, the re-entrant piston bowl alters the combustion process that could result in lower $NO_x$ formation and enhanced oxidation of soot, hydrocarbons, and carbon monoxide emissions. By changing the injection timing and injection characteristics (injection pressure, rate of injection, and spray angle), the acute re-entrant angle piston bowl offers the advantages of optimizing trade-off of emissions reduction versus performance improvement. For example, multiple injections through the high-pressure common rail injection can benefit from the acute re-entrant angle piston bowl with enhanced air movement and air utilization.

The delineated preferred embodiments are beneficial independent of fuel system employed by the diesel engine. In each of the preferred embodiments depicted in FIGS. 5, 6 and 7, the fuel spray pattern F is directed toward the respective concave pocket beneath the overhanging piston squish face at the terminus of the respective piston bowl edge radius. This feature facilitates improved fuel combustion, resulting in lowered harmful emissions and increased performance. When a fuel injection event is properly matched with the acute re-entrant angle crown bowl shape, the spray combustion process can be optimized to achieve higher fuel efficiency and lower exhaust emissions simultaneously. For example, advanced fuel injection systems, such as an electronically controlled high-pressure common rail system, the injection characteristics can be better matched with the bowl profile to facilitate enhanced spray-bowl interactions, which can lower the formation of undesirable emissions. With multiple fuel injections per combustion event, an acute re-entrant angle crown bowl offers additional flexibility in controlling the mixing process, wherein the spray-induced flow field takes the shape of the crown bowl. Thus, it is more likely that the combusting products will stay down in the hot region of the crown bowl where they have a higher chance of being completely burned. Any remaining unburned soot resides in the crown bowl during the expansion stroke, thus increasing the likelihood of being burned in the following combustion event, as compared to conventional shallow crown bowl shapes. Additionally, the resulting thermal and mechanical loads are relatively less severe, which permits re-entrant contours at the bowl edge (or lip or rim).

The herein delineated preferred embodiments can be retrofitted to existing engine hardware to improve the fuel-air mixing and enhanced air utilization within the cylinder.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A piston crown for a piston of a large-bore internal combustion engine comprising:
   a piston crown, said piston crown having a centerline and a diameter of at least 180 millimeters;
   a crown bowl formed in said piston crown, said crown bowl having a bowl sidewall, said bowl sidewall defining, with respect to the centerline, a maximum bowl radius and a minimum bowl radius;
   a piston squish face circumscribing said crown bowl; and
   a cooling chamber positioned below said piston squish face and in relation to said bowl sidewall;
   wherein said bowl sidewall has an acute re-entrant angle relative to said piston squish face, wherein said maximum bowl radius exceeds said bowl edge radius, wherein said maximum bowl radius is disposed further from said squish face than said minimum bowl radius is disposed from said squish face, wherein said crown bowl further includes a maximum bowl depth, wherein said crown bowl further includes a substantially frustoconical inner surface extending between the maximum bowl depth and the centerline, wherein a lower curve radius defines a lower curve of said crown bowl, wherein an upper curve radius defines an upper curve of said crown bowl, and wherein a sidewall tangent is formed by an intersection of the upper and lower curve radii, wherein the sidewall tangent defines an orientation of said bowl sidewall; and wherein said re-entrant angle is defined by an intersection of the sidewall tangent with respect to a plane parallel to said squish face, wherein said re-entrant angle is measured clockwise from the plane, and wherein the re-entrant angle is selected from a range of about 50 degrees to about 77 degrees, the maximum bowl radius is selected from a range of about 87 mm to about 94 mm, the minimum bowl radius is selected from a range of about 77 mm to about 89 mm, the maximum bowl depth is about 30 mm, the lower curve radius is about 10 mm, the upper curve radius is about 6 mm, and the piston crown diameter is about 263 mm.

2. The piston crown of claim 1, further comprising a bowl center depth, wherein said bowl center depth is about 5 mm.

3. A large-bore diesel engine, comprising:
   a cylinder defined by a cylinder liner having a liner wall; and
   a piston having a centerline and a diameter of at least 180 millimeters, said piston being reciprocable within said cylinder liner, said piston having a piston crown comprising:
   a crown bowl having a bowl sidewall, said bowl sidewall defining, with respect to the centerline, a maximum bowl radius and a minimum bowl radius;

a piston squish face circumscribing said crown bowl; and a cooling chamber positioned below said piston squish face and in relation to said bowl sidewall;

wherein said bowl sidewall has an acute re-entrant angle relative to said piston squish face, wherein said maximum bowl radius exceeds said bowl edge radius, wherein said maximum bowl radius is disposed further from said squish face than said minimum bowl radius is disposed from said squish face, wherein said crown bowl further includes a maximum bowl depth, wherein said crown bowl further includes a substantially frustoconical inner surface extending between the maximum bowl depth and the centerline, wherein a lower curve radius defines a lower curve of said crown bowl, wherein an upper curve radius defines an upper curve of said crown bowl, and wherein a sidewall tangent is formed by an intersection of the upper and lower curve radii, wherein the sidewall tangent defines an orientation of said bowl sidewall; and wherein said re-entrant angle is defined by an intersection of the sidewall tangent with respect to a plane parallel to said squish face, wherein said re-entrant angle is measured clockwise from the plane, and wherein the re-entrant angle is selected from a range of about 50 degrees to about 77 degrees, the maximum bowl radius is selected from a range of about 87 mm to about 94 mm, the minimum bowl radius is selected from a range of about 77 mm to about 89 mm, the maximum bowl depth is about 30 mm, the lower curve radius is about 10 mm, the upper curve radius is about 6 mm, and the piston crown diameter is about 263 mm.

4. The engine of claim 3, further comprising an anti-polish ring positioned at an upper portion of said liner wall adjacent said piston crown when said piston is at a top dead center position in said cylinder.

5. The engine of claim 4, wherein said piston has a piston ring package, and wherein said anti-polishing ring has a predetermined height such that said piston ring package does not come into contact with said anti-polishing ring during the reciprocation of said piston; and wherein said anti-polish ring projects a selected distance into said cylinder, and wherein a portion of said piston adjacent said piston crown is recessed a distance substantially equal to said selected distance.

6. The engine of claim 5, wherein said liner wall has an annular slot formed therein; and wherein said anti-polish ring is received by said slot.

7. The engine of claim 5, wherein said liner wall and said anti-polish ring are integrally formed as a single piece.

* * * * *